(12) United States Patent
Hammond, Jr. et al.

(10) Patent No.: US 10,562,109 B2
(45) Date of Patent: Feb. 18, 2020

(54) TAPERED DRILL BIT AND AUTOMATED PROCESS

(71) Applicant: The Boeing Company, Chicago, IL (US)

(72) Inventors: James A. Hammond, Jr., Ofallon, MO (US); Steven L. Arana, Collinsville, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/821,587

(22) Filed: Nov. 22, 2017

(65) Prior Publication Data

US 2019/0151958 A1 May 23, 2019

(51) Int. Cl.
| | |
|---|---|
| *B23B 51/06* | (2006.01) |
| *B23B 35/00* | (2006.01) |
| *B23D 77/12* | (2006.01) |
| *B23D 77/00* | (2006.01) |
| *B23B 51/08* | (2006.01) |

(52) U.S. Cl.
CPC .............. *B23B 51/06* (2013.01); *B23B 35/00* (2013.01); *B23D 77/006* (2013.01); *B23D 77/12* (2013.01); *B23B 51/08* (2013.01); *B23B 2215/04* (2013.01); *B23B 2222/88* (2013.01); *B23B 2251/043* (2013.01); *B23B 2251/404* (2013.01)

(58) Field of Classification Search
CPC ........ B23B 51/06; B23D 77/006; B23D 77/12
See application file for complete search history.

(56) References Cited

U.S. PATENT DOCUMENTS

| | | | | |
|---|---|---|---|---|
| 2,010,257 | A | * | 8/1935 | Fehse .................... B24B 19/006 29/557 |
| 2,411,209 | A | * | 11/1946 | Hall et al. ................. F28G 3/14 15/104.09 |
| 3,037,264 | A | * | 6/1962 | Mossberg ................. B23C 5/10 407/11 |
| 3,229,427 | A | * | 1/1966 | Staplehurst ............. B23B 51/06 408/57 |

(Continued)

FOREIGN PATENT DOCUMENTS

| | | | | |
|---|---|---|---|---|
| DE | 19843517 | A1 | * 3/2000 | ......... B23B 51/0081 |
| EP | 545826 | A1 | * 12/1992 | |

(Continued)

OTHER PUBLICATIONS

EPO machine translation of DE 19843517, printed Sep. 2018.*
Extended European Patent Search Report for EP Patent Application No. 18195783.8 dated Mar. 26, 2019.

*Primary Examiner* — Eric A. Gates
(74) *Attorney, Agent, or Firm* — Kunzler Bean & Adamson

(57) ABSTRACT

A tapered drill bit having a proximal end and a distal end includes a shank extending from the distal end at least partially towards the proximal end of the tapered drill bit and a body coupled to the shank. The body includes a tapered portion and the body extends from the shank to the proximal end of the tapered drill bit. The tapered drill bit further includes at least one flute extending from the proximal end along a portion of the body. The tapered drill bit also includes a conduit extending from an inlet aperture at the distal end to an outlet aperture, wherein the outlet aperture is formed through the at least one flute.

20 Claims, 7 Drawing Sheets

(56) References Cited

U.S. PATENT DOCUMENTS

| | | | | |
|---|---|---|---|---|
| 3,597,817 A * | 8/1971 | Whalley | B23C 5/1054 | |
| | | | 407/11 | |
| 4,134,704 A * | 1/1979 | Jackley | B23B 51/00 | |
| | | | 408/211 | |
| 4,475,850 A * | 10/1984 | Penoza | B23C 5/10 | |
| | | | 407/53 | |
| 4,693,646 A * | 9/1987 | Andrews | B23B 51/06 | |
| | | | 408/59 | |
| 5,022,798 A * | 6/1991 | Eckman | B23Q 11/04 | |
| | | | 408/1 R | |
| 5,174,692 A * | 12/1992 | Martin | B23B 51/0081 | |
| | | | 408/56 | |
| 6,045,301 A * | 4/2000 | Kammermeier | B23B 51/06 | |
| | | | 408/230 | |
| 6,116,825 A * | 9/2000 | Kammermeier | B23B 51/06 | |
| | | | 279/20 | |
| 7,131,790 B1 * | 11/2006 | Cordoves | F16L 5/00 | |
| | | | 405/184 | |
| 10,086,514 B2 * | 10/2018 | Fair | B25J 9/1612 | |
| 2013/0195572 A1 * | 8/2013 | Hiraki | B23D 77/006 | |
| | | | 408/1 R | |
| 2014/0271003 A1 * | 9/2014 | Sweetman | B22F 7/062 | |
| | | | 408/60 | |

FOREIGN PATENT DOCUMENTS

| | | |
|---|---|---|
| EP | 611624 A1 * | 2/1994 |
| EP | 2837454 | 2/2015 |
| FR | 2983422 | 6/2013 |
| JP | 2006181677 A * | 7/2006 |

* cited by examiner

TAPERED DRILL BIT AND AUTOMATED PROCESS

FIELD

This disclosure relates generally to tapered drill bits, and more particularly to tapered drill bits with drilling fluid conduits extending to flutes of the tapered drill bits.

BACKGROUND

Tapered fasteners are specially designed fasteners, used in many aircraft and aerospace applications, that provide greater strength than regular fasteners. Tapered fasteners are designed to completely fill a tapered hole without deforming the shank of the tapered bolt. The nut squeezes components with force against the tapered walls of the hole, creating radial compression and axial compression as the components are squeezed together. The combination of these forces generates greater strength than regular fasteners. Despite these and other advantages of tapered fasteners, the drilling of tapered holes for receiving tapered fasteners is a difficult and time consuming process.

SUMMARY

The subject matter of the present application has been developed in response to the present state of the art, and in particular, in response to the problems and disadvantages associated with conventional tapered drill bits that have not yet been fully solved by currently available techniques. Accordingly, the subject matter of the present application has been developed to provide embodiments of a system, an apparatus, and a method that overcome at least some of the above-discussed shortcomings of prior art techniques. For example, according to one implementation, a tapered drill bit for forming a tapered hole is disclosed, which facilitates reaming of tapered holes of different depths in high-strength materials using an automated process.

Disclosed herein is tapered drill bit for forming a tapered hole. The tapered drill bit having a proximal end and a distal end includes a shank extending from the distal end at least partially towards the proximal end of the tapered drill bit and a body coupled to the shank. The body includes a tapered portion and the body extends from the shank to the proximal end of the tapered drill bit. The tapered drill bit further includes at least one flute extending from the proximal end along a portion of the body. The tapered drill bit also includes a conduit extending from an inlet aperture at the distal end to an outlet aperture, wherein the outlet aperture is formed through the at least one flute. The preceding subject matter of this paragraph characterizes example 1 of the present disclosure.

The tapered drill bit further includes a plurality of flutes and a plurality of outlet apertures. The preceding subject matter of this paragraph characterizes example 2 of the present disclosure, wherein example 2 also includes the subject matter according to example 1, above.

Each flute of the plurality of flutes includes a corresponding outlet aperture of the plurality of outlet apertures. The preceding subject matter of this paragraph characterizes example 3 of the present disclosure, wherein example 3 also includes the subject matter according to example 2, above.

The at least one flute includes more than one outlet aperture. The preceding subject matter of this paragraph characterizes example 4 of the present disclosure, wherein example 4 also includes the subject matter according to any one of examples 2-3, above.

The conduit comprises a primary conduit that splits into more than one secondary conduit, each secondary conduit extending to a corresponding flute of the plurality of flutes. The preceding subject matter of this paragraph characterizes example 5 of the present disclosure, wherein example 5 also includes the subject matter according to any one of examples 2-4, above.

The conduit extends along a central axis of the tapered drill bit, and wherein the conduit extends at an angle from the central axis to the flute. The preceding subject matter of this paragraph characterizes example 6 of the present disclosure, wherein example 6 also includes the subject matter according to any one of examples 2-5, above.

Each of the outlet apertures is located at a different axial position along a length of the tapered drill bit. The preceding subject matter of this paragraph characterizes example 7 of the present disclosure, wherein example 7 also includes the subject matter according to any one of examples 2-6, above.

The outlet aperture is located at a point on a groove profile of the flute nearest a central axis of the tapered drill bit. The preceding subject matter of this paragraph characterizes example 8 of the present disclosure, wherein example 8 also includes the subject matter according to any one of examples 1-7, above.

The outlet aperture is located at a position more than one-half a flute length measured from the proximal end and less than three-quarters the flute length measured from the proximal end. The preceding subject matter of this paragraph characterizes example 9 of the present disclosure, wherein example 9 also includes the subject matter according to any one of examples 1-8, above.

The tapered drill bit does not comprise a countersink. Each one of the plurality of spaced apart patches is placed directly below a respective one of the plurality of pyrometers. The preceding subject matter of this paragraph characterizes example 10 of the present disclosure, wherein example 10 also includes the subject matter according to any one of examples 1-9, above.

The outlet aperture is located at an approximate midpoint along a flute length of the at least one flute measured from the proximal end. The preceding subject matter of this paragraph characterizes example 11 of the present disclosure, wherein example 11 also includes the subject matter according to any one of examples 1-10, above.

Also disclosed herein is an automated system for reaming tapered holes. The system includes a drilling machine, a cutting fluid dispensing system configured to dispense cutting fluid, and a tapered drill bit. The tapered drill bit having a proximal end and a distal end includes a shank extending from the distal end at least partially towards the proximal end of the tapered drill bit and a body coupled to the shank. The body includes a tapered portion and the body extends from the shank to the proximal end of the tapered drill bit. The tapered drill bit further includes at least one flute extending from the proximal end along a portion of the body. The tapered drill bit also includes a conduit extending from an inlet aperture at the distal end to an outlet aperture, wherein the outlet aperture is formed through the at least one flute. The preceding subject matter of this paragraph characterizes example 12 of the present disclosure.

The tapered drill bit is configured to ream a first tapered hole in a stack-up to a first depth and ream a second tapered hole to a second depth. The preceding subject matter of this paragraph characterizes example 13 of the present disclosure, wherein example 13 also includes the subject matter according to example 12, above.

The cutting fluid dispensing system is coupled to the tapered drill bit at the inlet aperture. The preceding subject matter of this paragraph characterizes example 14 of the present disclosure, wherein example 14 also includes the subject matter according to any one of examples 12-13, above.

Also disclosed herein a method of reaming a plurality of tapered holes. The method includes drilling a first tapered hole within a stack-up to a first drilling depth. The method also includes, while drilling, dispensing cutting fluid through a conduit formed between an inlet aperture and out an outlet aperture, wherein the outlet aperture is located on at least one flute of a tapered drill bit. The method further includes drilling a second tapered hole within the stack-up to a second drilling depth with the tapered drill bit. The method further includes, while drilling, dispensing cutting fluid out the outlet aperture formed in the conduit. The preceding subject matter of this paragraph characterizes example 15 of the present disclosure.

The stack-up includes titanium. The preceding subject matter of this paragraph characterizes example 16 of the present disclosure, wherein example 16 also includes the subject matter according to example 15, above.

The method further includes dispensing cutting fluid to a plurality of outlet apertures, wherein each outlet aperture is located on a different flute. The preceding subject matter of this paragraph characterizes example 17 of the present disclosure, wherein example 17 also includes the subject matter according to any one of examples 15 or 16, above.

The method further includes dispensing cutting fluid to a plurality of outlet apertures, wherein more than one outlet aperture is located on the at least one flute. The preceding subject matter of this paragraph characterizes example 18 of the present disclosure, wherein example 18 also includes the subject matter according to any one of examples 15-17, above.

The method further includes programming a drilling machine to automatically drill holes to a different drilling depth with a same tapered drill bit. The preceding subject matter of this paragraph characterizes example 19 of the present disclosure, wherein example 19 also includes the subject matter according to any one of examples 15-18, above.

The method further includes drilling without use of a countersink. The preceding subject matter of this paragraph characterizes example 20 of the present disclosure, wherein example 20 also includes the subject matter according to any one of examples 15-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
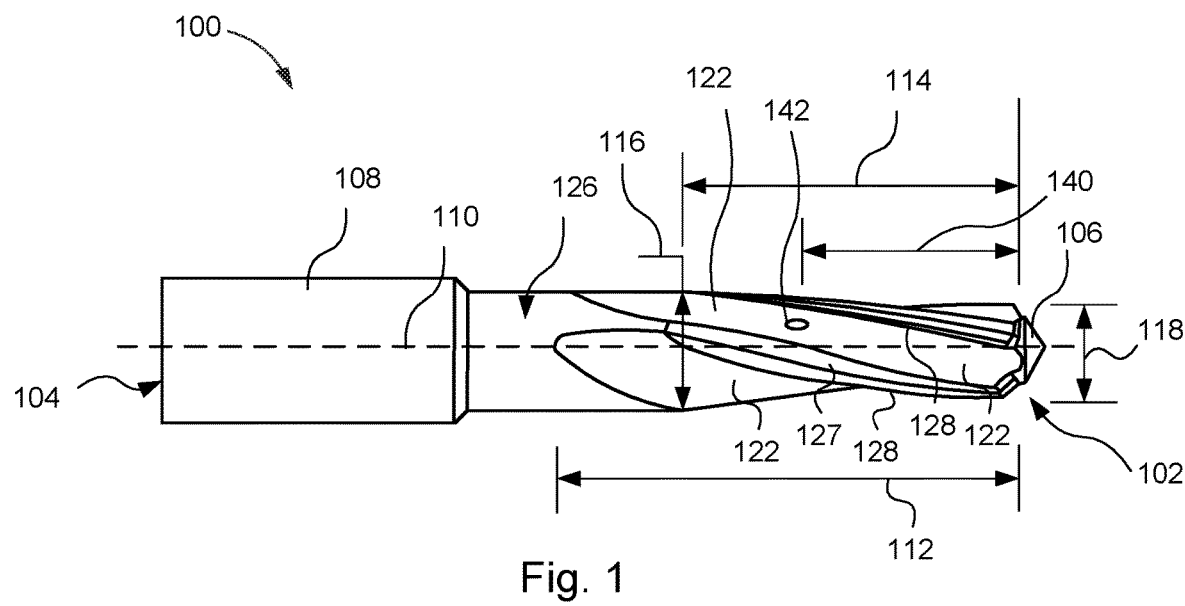
FIG. 1 is a side view of a tapered drill bit, according to one or more embodiments of the present disclosure.
Figure 2:
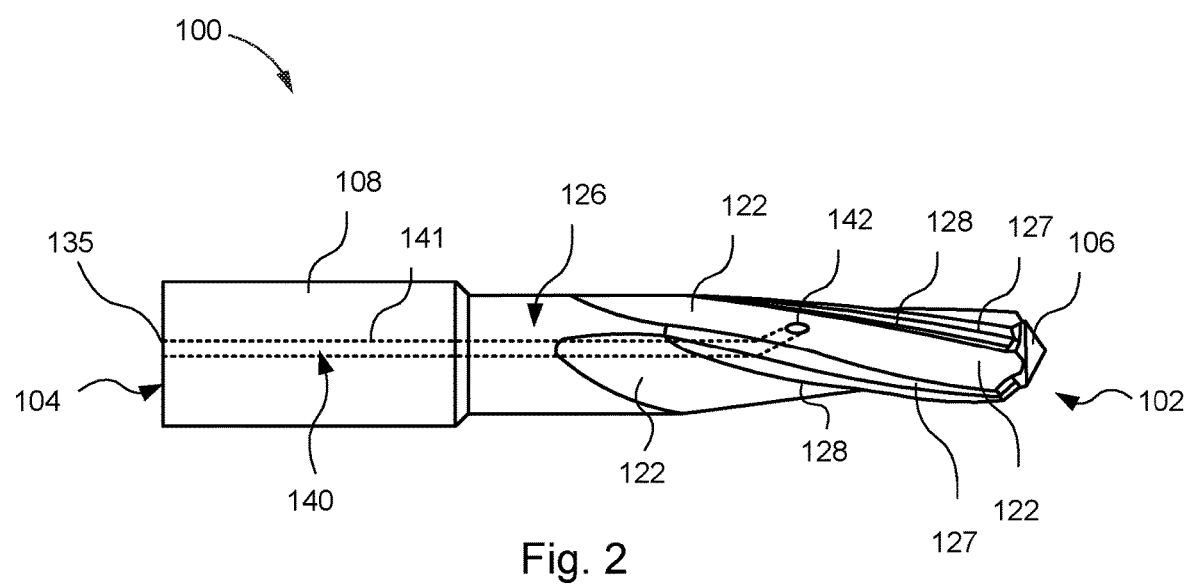
FIG. 2 is a side view of the tapered drill bit with an internal conduit shown in dashed line, according to one or more embodiments of the present disclosure.

Referring to FIGS. 1 and 2, one embodiment of a tapered drill bit 100 is shown. The tapered drill bit 100 is used to drill a tapered hole in a material, such as a part of an aircraft. As described in more detail below, the tapered drill bit 100 includes a conduit that channels cutting fluid or coolant to the flutes of the tapered drill bit 100.

The tapered drill bit 100 is a cutting tool designed to remove material and create tapered holes. According to certain embodiments, the tapered drill bit 100 is a solid drill bit made of one material (e.g., forms a one-piece, continuous, monolithic construction). In some embodiments, the tapered drill bit 100 includes a body made of one material with cutting lips or other features of the tapered drill bit 100 made of another material brazed or otherwise bonded in place. In yet some embodiments, the tapered drill bit 100 includes cutting lips or other features mechanically held in place.

The tapered drill bit 100 has a shaft-like shape and extends from a first or proximal end 102 to a second or distal end 104. The tapered drill bit 100 includes a shank 108, at the distal end 104, configured to be grasped by a drill or drilling device. The shank 108 is a cylindrical shape in the illustrated embodiment. Although depicted with a larger diameter than the diameter of a body 126 of the tapered drill bit 100, the shank 108 may have the same diameter or a smaller diameter than that of the body 126. Although depicted as smooth and circular, the shank 108 may include driving flats, tangs, grooves, raised beads, or threads in some implementations. In addition, the shank 108 may be tapered or non-circular shaped.

The tapered drill bit 100 includes a tip 106 at the proximal end 102 configured to cut into high-strength materials. The tip 106 may be formed monolithically with the remainder of the tapered drill bit 100 or may include small pieces of hard material fixed or brazed onto the tip 106. The tip 106 includes a chisel edge and cutting lips.

The tapered drill bit 100 includes a body 126 extending from the shank 108 to the proximal end 102. The body 126 includes a first portion including a substantially constant diameter and a tapered portion 114 that tapers from a first reamer diameter 116 to a second reamer diameter 118 at the tip 106 along the length of the tapered portion 114. The taper of the tapered portion 114 or the change in diameter over the length of the tapered portion 114 is substantially constant.

The body 126 includes a plurality of flutes 122 cut (or formed) into the body 126. The flutes 122 are helical grooves spiraling along a portion of the body 126 from the tip 106 at least partially towards the shank 108. While depicted as helical, in some implementations, the flutes 122 may be straight. The flutes 122 extend along the body 126 a flute length 112. Embodiments of the tapered drill bit 100 may include a different number of flutes 122 including, but not limited to, one, two, three or more flutes 122. Between the flutes 122, the tapered drill bit 100 includes lands 127. The lands are the peripheral portion of the body 126 that taper from the first reamer diameter 116 to the second reamer diameter 118 at the tip 106.

At a leading edge of the land 127, the tapered drill bit 100 includes a cutting edge 128. With conventional cylindrical drill bits, the cutting edge is located at the tip with all cuts occurring at the tip of the drill bit. However, with a tapered drill bit, as opposed to a cylindrical drill bit, the tapered drill bit 100 cuts or reams along the length of the tapered portion 114 and the cutting edge 128 extends along the length of the flutes 122. There is a cutting edge 128 that runs adjacent to each flute 122.

The tapered drill bit 100 includes a conduit 140 (see, for example, FIG. 2) that extends from an inlet aperture 135 at the distal end 104 to an outlet aperture 142. The conduit 140 primarily runs along the central axis 110 and extends along a portion of the length of the tapered drill bit 100. The conduit 140 extends at an angle from the central axis 110 at an elbow and extends out to the outlet aperture 142 on the flute 122. The conduit 140 is configured to dispense cutting fluid (or oil, coolant, or lubricant, etc.) to the cutting edge 128 to cool the cutting edge 128 and the tapered drill bit 100 while cutting. The delivery of cutting fluid enhances the ability of the tapered drill bit 100 to cut and lengthens the life of the tapered drill bit 100.

The outlet aperture 142 may be located at various positions along the length of the flute 122. In the illustrated embodiment, the outlet aperture 142 is located at an approximate midpoint along the flute length 112 of the flute 122. Approximate includes any position within five percent of the midpoint of the flute length 112. In some embodiments, the outlet aperture 142 is located at a position that is more than one-half the flute length 112 and less than three-quarters the flute length 112 measured from the proximal end 102. In some embodiments, the outlet aperture 142 is located at a position that is less than one-half the flute length 112 measured from the proximal end 102 (see, for example, the outlet aperture 142 in FIG. 7 located closer to the tip 106.

Figure 3:
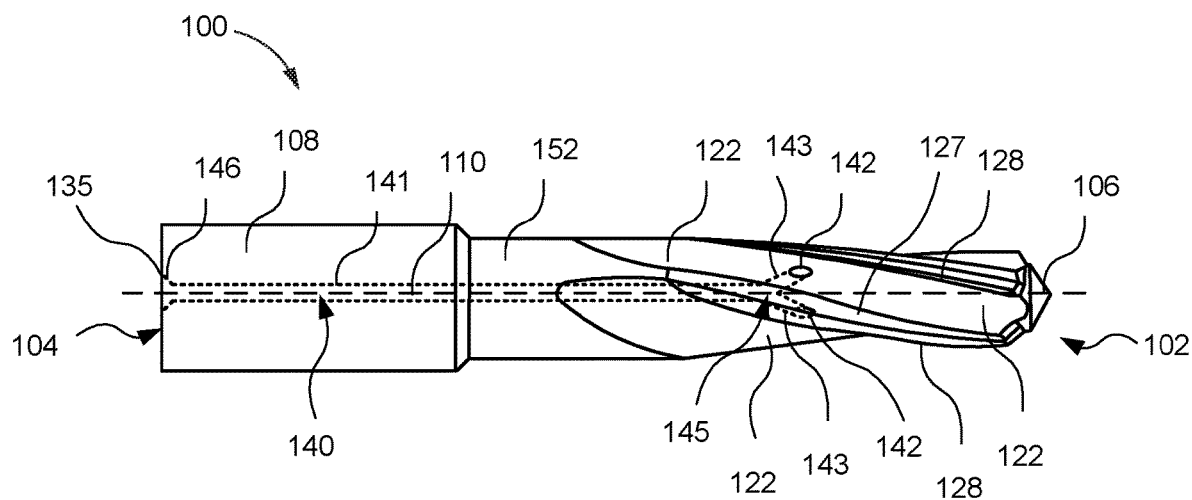
FIG. 3 is a side view of a tapered drill bit, according to one or more embodiments of the present disclosure.

Referring now to FIG. 3, a tapered drill bit 100 with a plurality of outlet apertures is shown. The tapered drill bit 100 includes an internal conduit similar to what is described in conjunction with FIGS. 1 and 2. The conduit 140 extends from an inlet aperture 135, with a chamfered surface 146 at the distal end 104 to a plurality of outlet apertures 142. The conduit 140 primarily runs along the central axis 110 and extends along a portion of the length of the tapered drill bit 100 along a primary conduit 141. In some embodiments, the conduit 140 includes the primary conduit 141 and at least one secondary conduit 143. In the illustrated embodiment, at a junction 145 the primary conduit 141 splits into two secondary conduits 143. The secondary conduits 143 extend at an angle from the central axis 110 and extend out, each secondary conduit 143 to a respective outlet aperture 142 on a respective flute 122.

The illustrated embodiment includes two outlet apertures 142. Some embodiments may include more than two outlet apertures 142. In some embodiments, each flute 122 of a plurality of flutes 122 includes an outlet aperture 142. That is, in some embodiments, the conduit 140 includes a primary conduit 141 that splits into more than one secondary conduit 143, each secondary conduit 143 extending to a corresponding flute 122 of the plurality of flutes 122.

The position of the plurality of outlet apertures 142 may be at a same position along a length of the tapered drill bit 100. That is, the primary conduit 141 may split to all secondary conduits 143 at a single junction 145 and each secondary conduit 143 may extend at a same angle from the central axis 110 to corresponding outlet apertures 142. In some embodiments, the plurality of outlet apertures 142 may each be located at a different axial position along a length of the tapered drill bit 100. As an example, a first outlet aperture 142 may be located at a position that is three-quarters the flute length 112 measured from the proximal end 102, while a second outlet aperture 142 may be located at a position that is one-half the flute length 112 measured from the proximal end 102.

Figure 4:
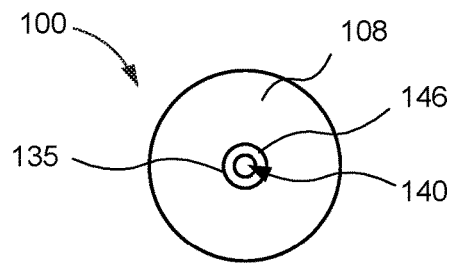
FIG. 4 is a rear view of a tapered drill bit, according to one or more embodiments of the present disclosure.

Referring now to FIG. 4, a rear view of a tapered drill bit 100 is shown. The illustrated embodiment depicts the shank 108 and the conduit 140. The conduit 140 begins at the inlet aperture 135 and extends along the central axis 110 of the tapered drill bit 100.

Figure 5:
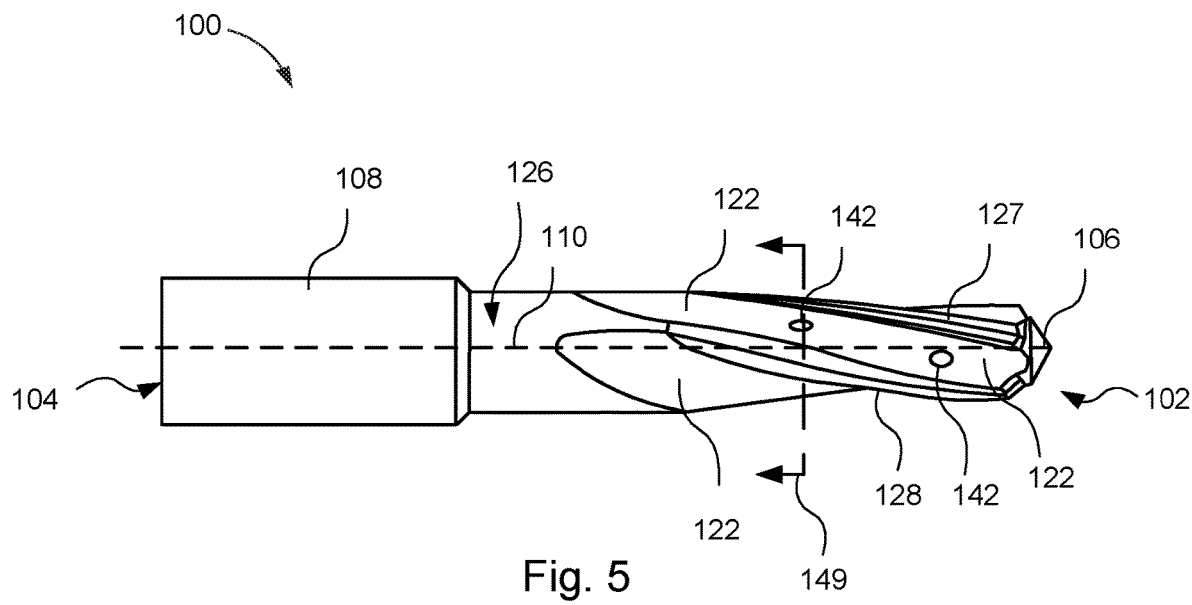
FIG. 5 is a side view of a tapered drill bit with a plurality of outlet apertures in a single flute, according to one or more embodiments of the present disclosure.

Referring now to FIG. 5, a side view of a tapered drill bit 100 with a plurality of outlet apertures 142 in a single flute 122 is shown. In the illustrated embodiment, the secondary conduits 143 may extend to the same flute 122 at different positions along a length of the tapered drill bit 100. As described earlier, the tapered drill bit 100 cuts all along the tapered portion 114 which increases friction and heat all along the tapered portion 114. As heat is generated all along the tapered portion 114, the plurality of secondary conduits 143 may feed cutting fluid more efficiently along the length of the tapered drill bit 100. In conventional drill bits, cutting fluid is provided at the tip of the drill bit by flowing coolant down the exterior of the drill bit or by applying coolant prior to drilling. In the illustrated embodiment of FIG. 5, the cutting fluid may be dispensed at locations closer to the cutting edge 128 which will allow for more efficient distribution of the cutting fluid along the length of the cutting edge 128.

Figure 6:
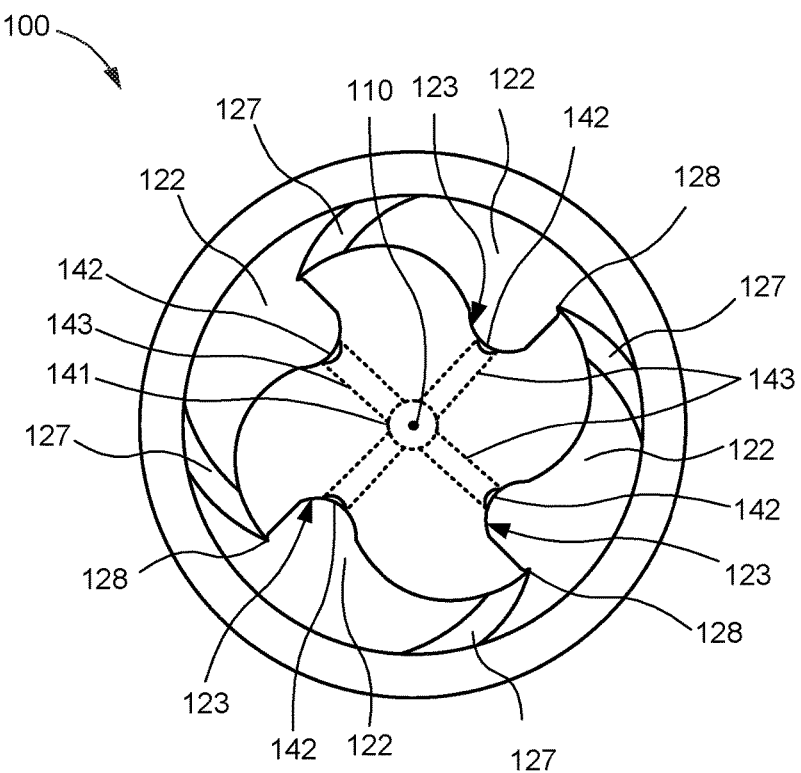
FIG. 6 is a front cross-sectional view of a tapered drill bit, according to one or more embodiments of the present disclosure.

Referring now to FIG. 6, a front cross-sectional view of a tapered drill bit 100 at a plane 149 (see FIG. 5) is shown. The illustrated embodiment includes four flutes 122 with four lands 127 between the flutes 122. The illustrated embodiment further depicts the primary conduit 141 which runs along the central axis 110 of the tapered drill bit 100. The primary conduit 141 splits of into four secondary conduits 143. Each secondary conduit 143 extends from the primary conduit 141 to a respective outlet aperture 142. As the tapered drill bit 100 includes four flutes 122, each secondary conduit 143 extends to a different flute 122. The illustrated embodiment also depicts a groove profile 123 for the flutes. The groove profile 123 is the profile of the groove made by the flutes 122. While an example of a groove profile 123 is depicted FIG. 6, the groove profile 123 may take on a plurality of different shapes and configurations.

In the illustrated embodiment, the outlet apertures 142 are located at a lowest point in the valley of the groove profile 123. In other words, the outlet apertures 142 are each located at a point on the groove profile 123 of the flute 122 nearest the central axis 110 of the tapered drill bit 100. Such a configuration allows for the secondary conduit 143 to be as short as possible. In other embodiments, the outlet apertures 142 may be located at other points on the groove profile 123 including closer to the cutting edge 128 on the trailing slope of the groove profile 123. In other embodiments, the outlet apertures 142 may be located on the leading slope of the groove profile 123.

Figure 7:
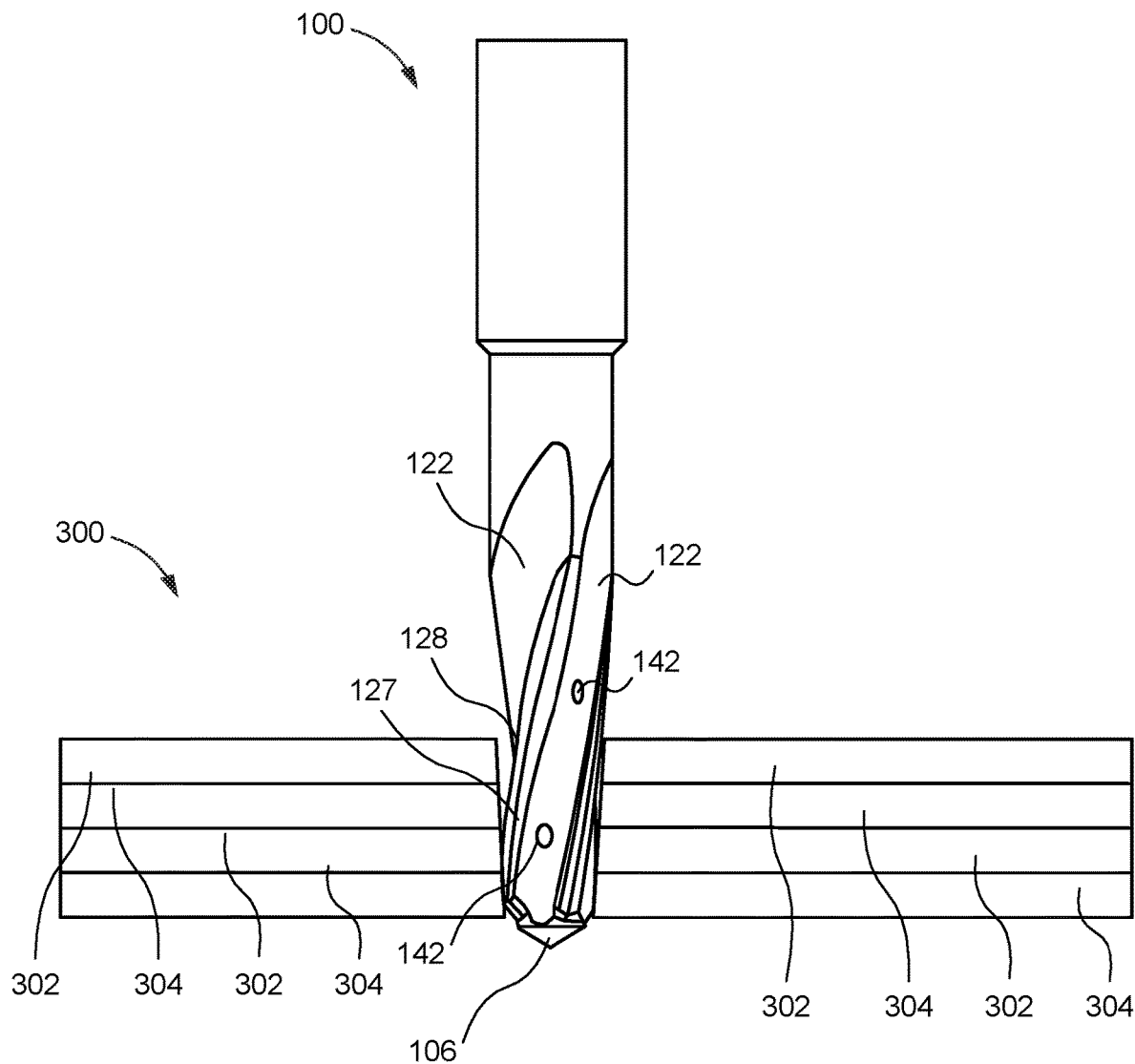
FIG. 7 is a side view of a tapered drill bit reaming a stack-up, according to one or more embodiments of the present disclosure.

Referring now to FIG. 7, a tapered drill bit 100 reaming a tapered hole into a stack-up 300 is shown. The stack-up 300 includes a plurality of material layers which include titanium 302 and aluminum 304. Titanium is a high strength material that is difficult to cut. Cutting into titanium can produce large amounts of heat which may damage the cutting tools and cause embrittlement. Embodiments of the tapered drill bit 100 described herein allow for the cutting of tapered holes into titanium. Tapered holes are easier to cut into softer metals, such as aluminum. However, the tapered drill bits 100 including conduits 140 which enable the dispersal of cutting fluid at the flutes 122, allows for more efficient cooling of cutting edges 128 and quicker cutting of tapered holes in high strength materials such as titanium. In addition, the manufacturing life of the drill bits is increased allowing for more tapered holes to be reamed with a single tapered drill bit 100. Although the depicted stack-up 300 includes titanium 302 and aluminum 304, other stack-ups 300 may include only titanium 302, other hard metals, or other soft metals such as aluminum, or combinations thereof.

Referring again to FIG. 7, a tapered hole has been reamed into the stack-up 300. As the tapered hole is being cut, cutting fluid is fed from the inlet aperture 135 through the primary conduit 141 and out the plurality of outlet apertures 142. With the outlet apertures 142 along the length of the flutes 122, the tapered drill bit 100 can be made longer to drill longer tapered holes. With the longer tapered drill bits 100, a plurality of depths may be cut with a single tapered drill bit 100. In conventional drill bits, the drill bits are not configured to ream tapered holes at different depths. One way the depth is controlled in conventional drill bits is through a countersink on the conventional drill bit. The countersink restricts the drill bit from reaming past a certain depth allowing the drill bit to be used to ream tapered holes to a single depth. Embodiments described herein do not include a countersink on the tapered drill bit 100.

Figure 8:
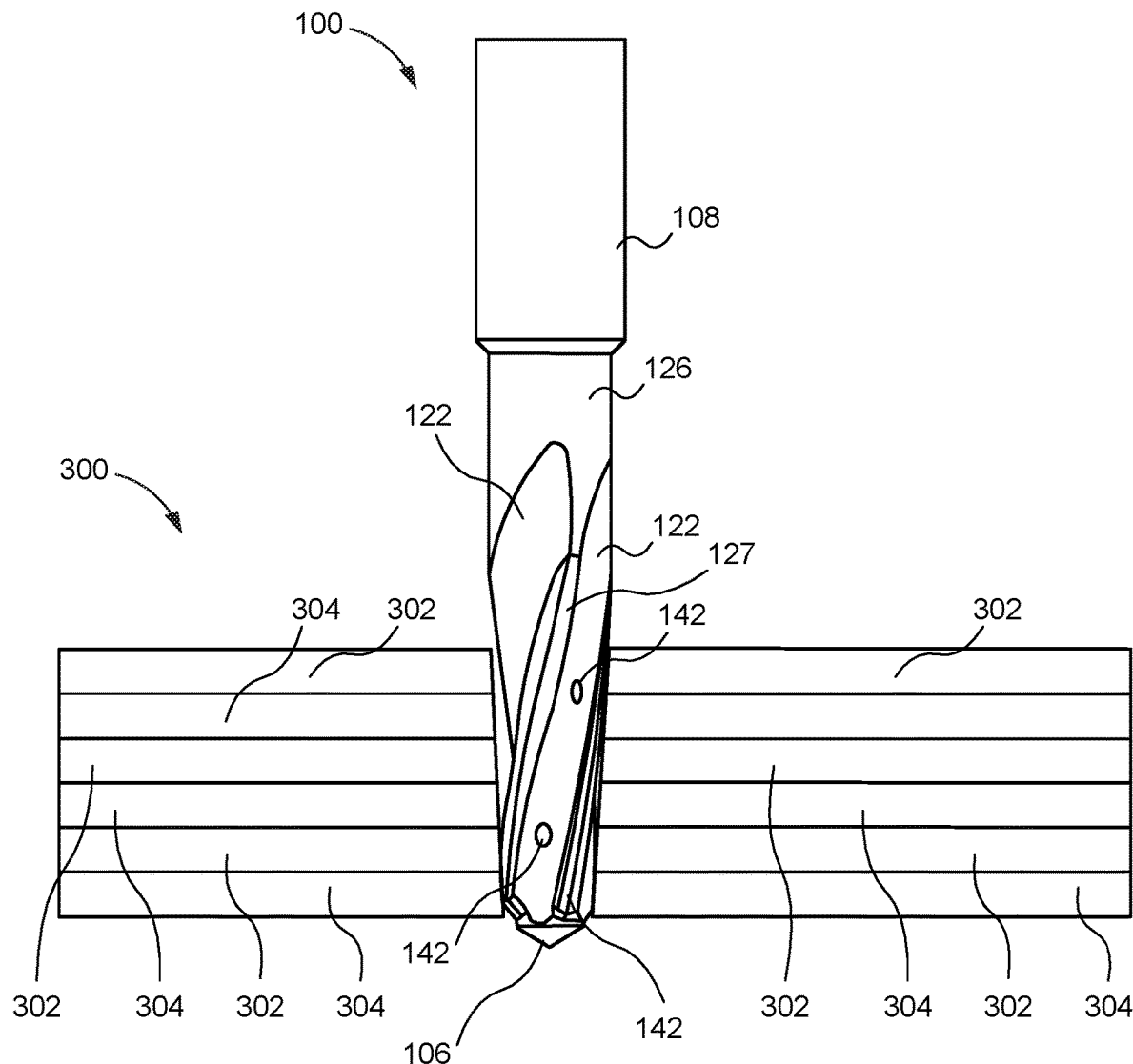
FIG. 8 is a side view of a tapered drill bit reaming a stack-up, according to one or more embodiments of the present disclosure.

As such, the same tapered drill bit 100 may be utilized to ream a tapered hole in the stack-up 300 depicted in FIG. 7 and the stack-up depicted in FIG. 8. The same tapered drill bit 100 is utilized for both tapered holes. When reaming a large number of tapered holes into a stack-up 300, the ability to utilize a single tapered drill bit 100 allows for a drastic reduction in machining time as the tapered drill bit 100 does not need to be removed and replaced when a different size tapered hole is reamed. The time and cost savings allows for production times to be reduced and further allows for the reduction in the number drill bits needed.

Figure 9:
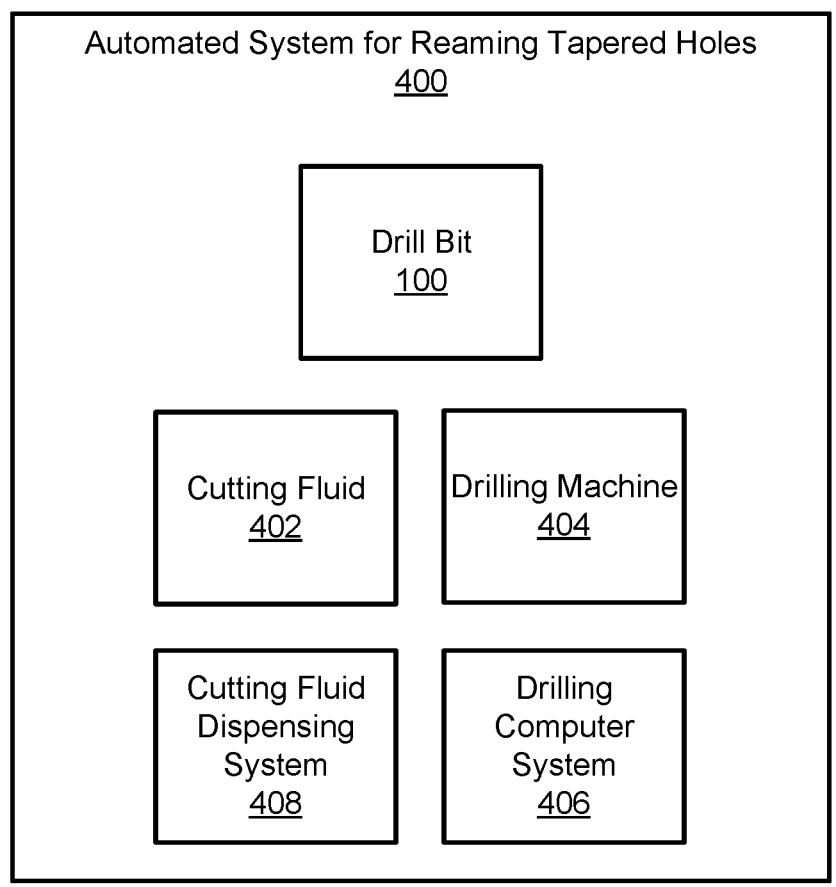
FIG. 9 is a block diagram of an automated system for reaming tapered holes, according to one or more embodiments of the present disclosure.

Referring now to FIG. 9, a block diagram of an automated system 400 for reaming tapered holes is shown. The automated system 400 is configured to further reduce time and machining costs for reaming different size tapered holes. The automated system 400 includes tapered drill bit 100. The tapered drill bit 100 of the automated system 400 may include some or all of the features described herein in conjunction with the remaining figures. The automated system 400 further includes a cutting fluid dispensing system 408 which is configured to dispense cutting fluid 402 through the tapered drill bit 100 to outlet apertures 142 on the tapered drill bit 100. The automated system 400 further includes a drilling machine 404 which is configured to grasp the tapered drill bit 100 at a shank 108 and rotate the tapered drill bit 100 at a high rate of speed.

The automated system 400 further includes a drilling computer system 406. The drilling computer system 406 may include various components, not illustrated, to allow for control of the components of the system 400 described herein, such as, but not limited to, processors, memory, computer hardware and software, and modules. The drilling computer system 406 is configured, in some embodiments, to regulate the flow of cutting fluid 402 through the tapered drill bit 100. The drilling computer system 406 may be further configured to control the depth of cutting of the tapered drill bit 100 for a plurality of tapered holes.

In some embodiments, the drilling computer system 406 is configured to divide a plurality of tapered holes to be drilled within a stack-up, such as stack-up 300 shown in FIGS. 7 and 8, into two or more group sizes corresponding to a drilling depth. The drilling computer system 406 is programmed to drill each tapered hole to a depth corresponding to its associated group size. With drilling computer system 406, the same tapered drill bit 100 may be utilized to ream a plurality of tapered holes to different depths.

Figure 10:
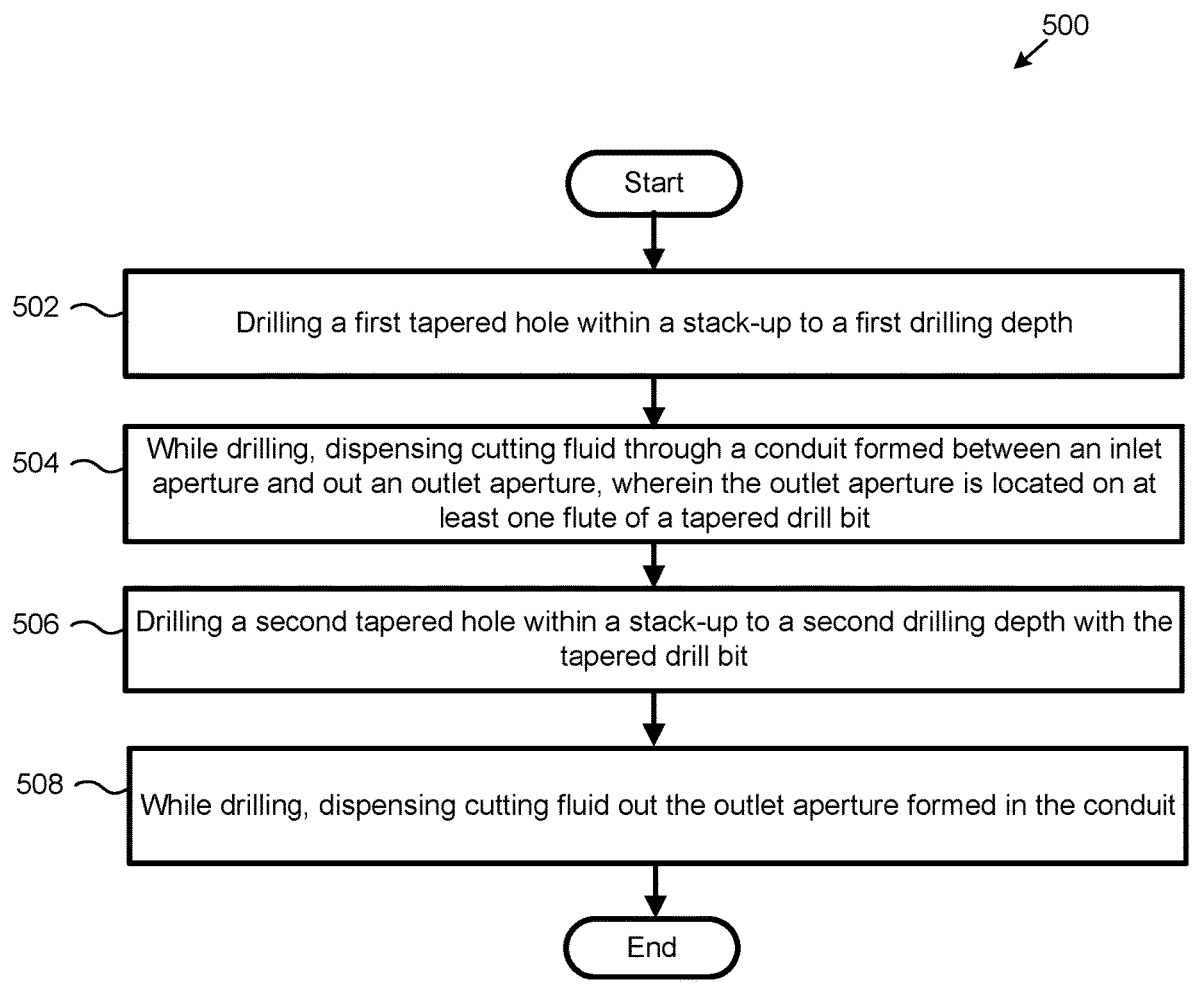
FIG. 10 is a schematic flow diagram of a method of reaming a plurality of tapered holes, according to one or more embodiments of the present disclosure.

Now referring to FIG. 10, one embodiment of a method 500 of reaming a plurality of tapered holes is shown. The method 500 includes drilling a first tapered hole within a stack-up to a first drilling depth at 502 and while drilling, dispensing cutting fluid through a conduit formed between an inlet aperture and out an outlet aperture, wherein the outlet aperture is located on at least one flute of a tapered drill bit at 504. At 506, the method 500 includes drilling a second tapered hole within a stack-up to a second drilling depth the tapered drill bit. At 508, the method 500 includes dispensing cutting fluid out the outlet aperture formed in the conduit. The method then ends.

In some embodiments, the method may include dividing a plurality of tapered holes to be drilled within a stack-up into two or more group sizes corresponding to a drilling depth. In some embodiments, the method may include programming the drilling machine to drill each tapered hole to a depth corresponding to its associated group size.

In some embodiments, the stack-up includes titanium. In some embodiments, the stack-up includes a combination of titanium and aluminum. In some embodiments, the stack-up includes a combination of titanium and other high strength materials.

In some embodiments, the method further includes dispensing cutting fluid to a plurality of outlet apertures, wherein each outlet aperture is located on a different flute. In some embodiments, the method further includes dispensing cutting fluid to a plurality of outlet apertures, wherein more than one outlet aperture is located on the at least one flute.

In some embodiments, the method further includes programming a drilling machine to automatically drill holes to a different drilling depth with a same tapered drill bit. In some embodiments, the method further includes drilling without use of a countersink while drilling the first tapered hole and the second tapered hole.

Although described in a depicted order, the method may proceed in any of a number of ordered combinations.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagram included herein is generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A tapered drill bit for forming a tapered hole, the tapered drill bit having a proximal end and a distal end, said tapered drill bit comprising:
   a shank extending from the distal end at least partially towards the proximal end of the tapered drill bit;

a body coupled to the shank, the body comprising a tapered portion and the body extending from the shank to the proximal end of the tapered drill bit;

a plurality of flutes extending from the proximal end along a tapered portion of the body, wherein each one of the plurality of flutes spirals along the tapered portion and terminates at a non-tapered portion of the body, wherein the tapered portion has a first reamer diameter adjoining the non-tapered portion of the body, the first reamer diameter matching a diameter of the non-tapered portion of the body; and a conduit extending from an inlet aperture at the distal end to an outlet aperture, wherein the outlet aperture is formed through a respective one of the plurality of flutes.

2. The tapered drill bit according to claim 1, further comprising
a plurality of outlet apertures.

3. The tapered drill bit according to claim 2, wherein each of the plurality of outlet apertures is located on a respective one of the plurality of flutes.

4. The tapered drill bit according to claim 2, wherein the conduit comprises a primary conduit that splits into more than one secondary conduit, each secondary conduit extending to a corresponding flute of the plurality of flutes.

5. The tapered drill bit according to claim 2, wherein the conduit extends along a central axis of the tapered drill bit, and wherein the conduit splits, at a single junction, into a plurality of secondary conduits each extending at an angle less than ninety degrees from the central axis to each respective flute.

6. The tapered drill bit according to claim 2, wherein each of the outlet apertures is located at a different axial position along a length of the tapered drill bit.

7. The tapered drill bit according to claim 2, wherein the respective one of the plurality of flutes comprises more than one of the plurality of outlet apertures.

8. The tapered drill bit according to claim 1, wherein the outlet aperture is located at a point on a groove profile of the respective one of the plurality of flutes to be nearest a central axis of the tapered drill bit.

9. The tapered drill bit according to claim 1, wherein the outlet aperture is located at a point on a trailing slope of a groove profile of the respective one of the plurality of flutes.

10. The tapered drill bit according to claim 1, wherein the outlet aperture is located at an approximate midpoint along a flute length of the at least one flute measured from the proximal end.

11. The tapered drill bit according to claim 1, wherein the outlet aperture is located at a point on a leading slope of a groove profile of the respective one of the plurality of flutes.

12. An automated system for reaming tapered holes, comprising:
a drilling machine;
a tapered drill bit, the tapered drill bit having a proximal end and a distal end, said tapered drill bit comprising:
a shank extending from the distal end at least partially towards the proximal end of the tapered drill bit;
a body coupled to shank, the body comprising a tapered portion, the body extending from the shank to the proximal end of the tapered drill bit;
a plurality of flutes extending from the proximal end along a tapered portion of the body, wherein each of the plurality of flutes spirals along the tapered portion and terminates at a non-tapered portion of the body, wherein the tapered portion has a first reamer diameter adjoining the non-tapered portion of the body, the first reamer diameter matching a diameter of the non-tapered portion of the body; and
a conduit extending from an inlet aperture at the distal end to an outlet aperture, wherein the outlet aperture is formed through a respective one of the plurality of flutes; and
a cutting fluid dispensing system configured to dispense cutting fluid into the conduit.

13. The system according to claim 12, wherein the cutting fluid dispensing system is coupled to the tapered drill bit at the inlet aperture.

14. The system according to claim 12, wherein the outlet aperture is located at a point on a leading slope of a groove profile of a respective one of the plurality of flutes.

15. A method of reaming a plurality of tapered holes, the method comprising:
drilling a first tapered hole through an entirety of a stack-up to a first drilling depth with a tapered drill bit;
while drilling, dispensing cutting fluid through a conduit formed between an inlet aperture and out an outlet aperture, wherein the outlet aperture is located on at least one flute of a plurality of flutes of the tapered drill bit, wherein the at least one flute spirals along a tapered portion of the tapered drill bit and terminates at a non-tapered portion of the tapered drill bit, wherein the tapered portion has a first reamer diameter adjoining the non-tapered portion, the first reamer diameter matching a diameter of the non-tapered portion of the tapered drill bit;
drilling a second tapered hole through an entirety of the stack-up to a second drilling depth with the tapered drill bit, wherein the stack-up at the first tapered hole is a first thickness and the stack-up at the second tapered hole is a second thickness, and wherein the first thickness is the same as the second thickness; and
while drilling, dispensing cutting fluid out the outlet aperture formed in the conduit.

16. The method according to claim 15, wherein the stack-up comprises titanium.

17. The method according to claim 15, further comprising dispensing cutting fluid to a plurality of outlet apertures, wherein each outlet aperture is located on a different flute of the plurality of flutes.

18. The method according to claim 15, further comprising dispensing cutting fluid to a plurality of outlet apertures, wherein more than one outlet aperture is located on a same flute of the plurality of flutes.

19. The method according to claim 15, further comprising programming a drilling machine to automatically drill holes to a different drilling depth with a same tapered drill bit.

20. The method according to claim 15, further comprising drilling without use of a countersink.

* * * * *